United States Patent
Ji et al.

(10) Patent No.: US 9,794,024 B2
(45) Date of Patent: Oct. 17, 2017

(54) ADAPTIVE CHANNEL STATE FEEDBACK ESTIMATION

(71) Applicant: Apple Inc., Cupertino, CA (US)

(72) Inventors: Zhu Ji, Cupertino, CA (US); Navid Damji, Cupertino, CA (US); Johnson Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 422 days.

(21) Appl. No.: 14/075,816

(22) Filed: Nov. 8, 2013

(65) Prior Publication Data

US 2014/0133329 A1    May 15, 2014

Related U.S. Application Data

(60) Provisional application No. 61/725,255, filed on Nov. 12, 2012.

(51) Int. Cl.
  *H04L 1/00* (2006.01)
  *H04W 24/10* (2009.01)
  (Continued)

(52) U.S. Cl.
  CPC .......... *H04L 1/0023* (2013.01); *H04L 1/0026* (2013.01); *H04L 25/0204* (2013.01);
  (Continued)

(58) Field of Classification Search
  CPC ..... H04L 5/0048–5/0057; H04W 24/02–24/10
  See application file for complete search history.

(56) References Cited

U.S. PATENT DOCUMENTS 7,436,757 B1    10/2008 Wilson et al.
8,194,558 B2    6/2012 Choi et al.
(Continued)

FOREIGN PATENT DOCUMENTS

WO    2009/009542 A2    1/2009
WO    2013/176873 A    11/2013

OTHER PUBLICATIONS

3GPP TS 36.213, "LTE; Evolved Universal Terrestrial Radio Access (E-UTRA); Physical layer procedures," V9.3.0, Oct. 2010.
(Continued)

*Primary Examiner* — Marcus R Smith
(74) *Attorney, Agent, or Firm* — Meyertons, Hood, Kivlin, Kowert & Goetzel, P.C.

(57) ABSTRACT

Aspects of the present invention provide apparatuses and methods for adaptive channel state feedback (CSF) estimation techniques. Downlink transmissions can be received at a mobile device. The downlink transmissions can be received after the mobile device has entered a power saving mode of operation. The downlink transmission received can be a discontinuous downlink subframe and can include one or more pilot symbols. A channel variation factor of the transmission channel can be determined based on the received downlink transmission. Based on the amount of variation of the transmission channel, either an earlier-received or a later-received pilot symbol can be used for CSF estimation. Further, either higher or lower weighted filter coefficients can be selected for use in CSF estimation based on the amount of variation of the transmission channel.

16 Claims, 5 Drawing Sheets

(51) Int. Cl.
  *H04L 25/02* (2006.01)
  *H04B 7/06* (2006.01)
(52) U.S. Cl.
  CPC ...... *H04L 25/0222* (2013.01); *H04L 25/0224* (2013.01); *H04W 24/10* (2013.01); *H04B 7/065* (2013.01)

(56) References Cited

U.S. PATENT DOCUMENTS

| | | | |
|---|---|---|---|
| 9,319,204 B2* | 4/2016 | Kazmi | H04L 5/0091 |
| 2004/0076224 A1 | 4/2004 | Onggosanusi et al. | |
| 2004/0109515 A1 | 6/2004 | Krauss et al. | |
| 2007/0280116 A1 | 12/2007 | Wang et al. | |
| 2008/0075182 A1 | 3/2008 | Hsieh et al. | |
| 2008/0137788 A1 | 6/2008 | Bang et al. | |
| 2010/0067366 A1 | 3/2010 | Nicoli | |
| 2010/0091892 A1 | 4/2010 | Gorokhov | |
| 2010/0246527 A1* | 9/2010 | Montojo | H04L 25/0226 370/330 |
| 2011/0069629 A1 | 3/2011 | Breit et al. | |
| 2011/0176466 A1* | 7/2011 | Lindoff | H04W 52/0225 370/311 |
| 2013/0242778 A1* | 9/2013 | Geirhofer | H04L 1/0026 370/252 |
| 2013/0258877 A1* | 10/2013 | Ji | H04B 7/0632 370/252 |
| 2013/0259009 A1* | 10/2013 | Berggren | H04W 72/0446 370/336 |
| 2014/0050278 A1* | 2/2014 | Bergman | H04B 7/0404 375/267 |
| 2014/0086187 A1* | 3/2014 | Kang | H04L 5/0051 370/329 |

OTHER PUBLICATIONS

R. H. Clarke, "A Statistical Theory of Mobile Radio Reception", Bell Systems Technical Journal, vol. 47(6): 957-1000, Jul.-Aug. 1968.
33GPP TS 36:321, "LTE; Evolved Universal Terrestrial Radio Access (E-UTRA); Medium Access Control (MAC) protocol specification," V9.6.0, Mar. 2012.
International Search Report and Written Opinion, dated Mar. 12, 2014, from corresponding International Patent Application No. PCT/US2013/069291, filed Nov. 8, 2013.

* cited by examiner

ADAPTIVE CHANNEL STATE FEEDBACK ESTIMATION

CROSS-REFERENCE TO RELATED APPLICATIONS

The present application claims priority to U.S. Provisional Application No. 61/725,255, filed Nov. 12, 2012, the entirety of which is incorporated by reference herein.

BACKGROUND

Field of the Invention

The present invention relates to channel state feedback (CSF) estimation techniques in wireless communication systems.

Background Art

Wireless communication system transmissions can be classified as either downlink (DL) or uplink (UL) transmissions. Downlink transmissions refer to signals transmitted from a base station (e.g., an eNodeB) to a mobile device (e.g., a user equipment (UE)). Uplink transmissions refer to signals transmitted from the mobile device (e.g., the UE) to the base station (e.g., the eNodeB). To ensure reliable and consistent communication, wireless systems often track the channel state conditions and adjust communication parameters (e.g., power or modulation parameters) accordingly. As an example, in TD-LTE systems, UE's calculate channel state feedback (CSF) reports based on downlink signals.

Figure 1:
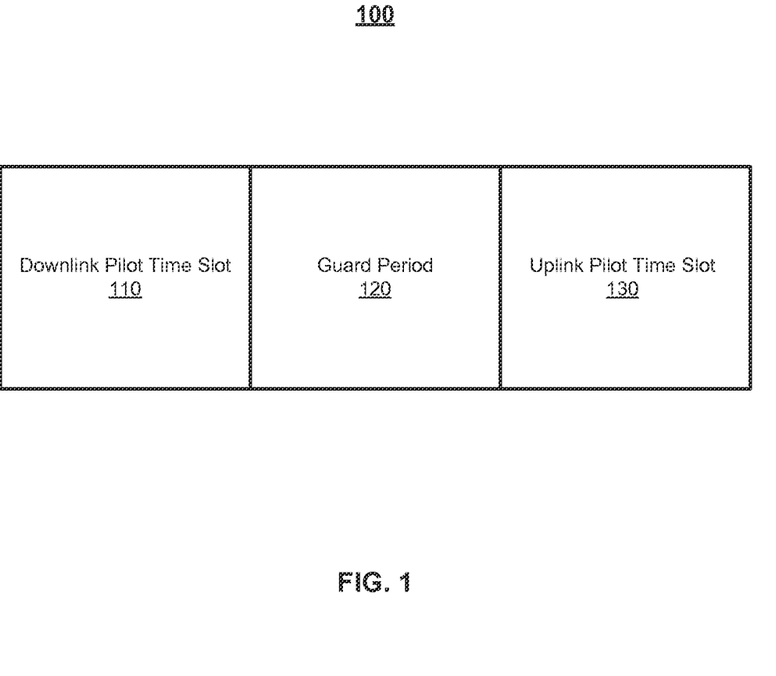
FIG. 1 illustrates an exemplary special subframe for a time-division (TD) based wireless communication system.

In a time-division (TD) based wireless communication system, such as TD-LTE, a frame structure for transmissions can include a plurality of subframes. The subframes can be designated as either uplink or downlink subframes. The frame structure can also include at least one special subframe. FIG. 1 illustrates an exemplary special subframe 100 for a TD wireless communication system, such as TD-LTE. The special subframe 100 can include a downlink pilot time slot or transmission 110, a guard period 120, and an uplink pilot time slot or transmission 130. The uplink and downlink pilot transmissions 110 and 130 can include reference signals. The reference signals can be used for a number of purposes including channel measurements or maintaining synchronization. The guard period 120 can separate the uplink and downlink pilot transmissions 110 and 130 to account for the round trip delay experienced by transmissions between the mobile device and the base station, and to account for multipath delay. Hence, the duration of the guard period 120 can directly correlate to the cell size (i.e., the larger the cell size, the longer the guard period 120).

For many TD wireless communication systems, such as TD-LTE, the number of uplink and downlink subframes can be varied. That is, while the total number of subframes in a frame structure can be fixed, the number of individual uplink subframes and downlink frames within a particular frame can be adjusted, and can vary from frame to frame. Consequently, downlink subframes are not always transmitted consecutively. Specifically, downlink subframes can be discontinuous because downlink subframes can be separated by one or more uplink subframes and/or one or more special subframes. Transmission parameters for a downlink subframe can be set based on CSF information where the CSF information, generally, is based on prior downlink transmissions. However, CSF information for discontinuous downlink subframes may not be accurate because channel states can change during the gaps between downlink subframes, which can lead to deterioration in communication quality.

Existing CSF estimation techniques for handling discontinuous downlink subframes are not optimal for varying channel state conditions. One technique is to simply ignore the first downlink subframe received after a gap of uplink subframes and/or special frames. In doing so, information for determining a reliable CSF estimation can be wasted. Further, if the mobile device is operating in a power save mode, ignoring the first discontinuous downlink subframe may require the mobile to consume more power waiting and then subsequently processing a next received downlink subframe to generate a CSF estimation.

Accordingly, what is needed is an adaptive CSF estimation technique; in particular, an adaptive CSF estimation technique that can accommodate varying channel state conditions and discontinuous downlink subframes.

BRIEF DESCRIPTION OF THE DRAWINGS

The accompanying drawings illustrate the present invention and, together with the description, further serve to explain the principles of the invention and to enable one skilled in the pertinent art to make and use the invention.

DETAILED DESCRIPTION

Aspects of the present invention provide apparatuses and methods for adaptive channel state feedback (CSF) estimation techniques. Downlink transmissions can be received at a mobile device. The downlink transmissions can be received after the mobile device has entered a power saving mode of operation. The downlink transmission received can be a discontinuous downlink subframe and can include one or more pilot symbols. A channel variation factor of the transmission channel can be determined based on the received downlink transmission. Based on the amount of variation of the transmission channel, either an earlier-received or a later-received pilot symbol can be used for CSF estimation. Further, either higher or lower weighted filter coefficients can be selected for use in CSF estimation based on the amount of variation of the transmission channel. The CSF estimation can extend to multiple received downlink transmission and to multiple pilot symbols received that can be received in each downlink transmission.

Figure 2:
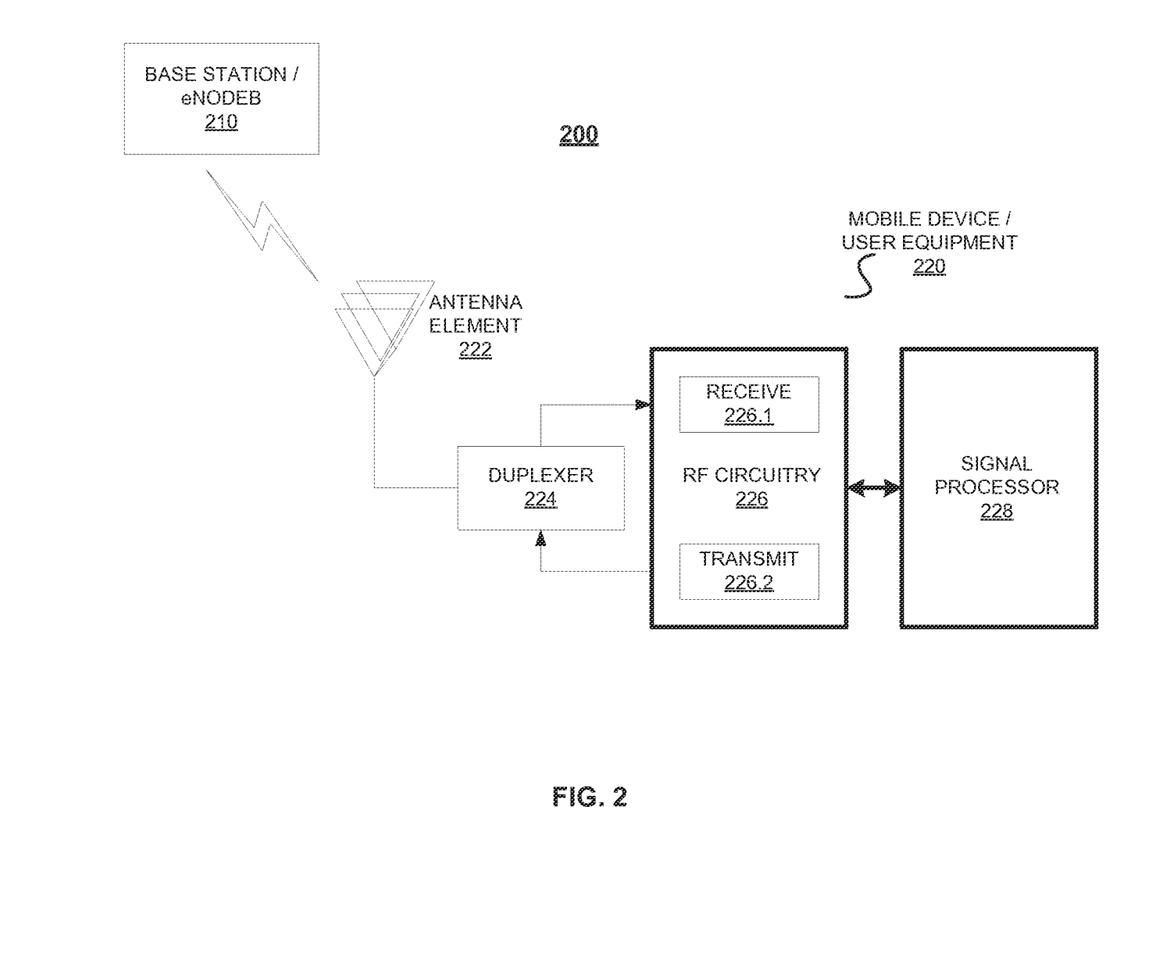
FIG. 2 illustrates a wireless communication system according to an aspect of the present invention.

FIG. 2 illustrates a wireless communication system 200 according to an aspect of the present invention. The wireless communication system 200 can include a base station 210. The base station 210 can be an eNodeB. The wireless communication system 200 can further include a mobile device 220. The mobile device 220 can be a user equipment (UE). The mobile device 220 can include an antenna element 222 and a duplexer 224. The antenna element 222 can include one or more antennas to transmit and receive radio-frequency (RF) signals to/from the base station 210. As an example, the antenna element 222 may be a part of a multiple-input multiple-output (MIMO) system. The duplexer 224 can provide respective transmit and receive paths.

The mobile device 220 can further include RF circuitry 226 and a signal processor 228. The RF circuitry 226 that can include receive circuitry 226.1 and transmit circuitry 226.2. The RF circuitry 126 may include mixers, amplifiers, and/or other components to up-convert baseband signals to RF and to down-covert RF signals to baseband. The signal processor 228 can process baseband signals.

The wireless communication system 200 may be provided as a time-division (TD) based wireless communication system, for example a TD-LTE system. Also, the wireless communication system 200 may provide discontinuous downlink and/or uplink transmission, and different uplink and downlink time slots may be configured for a given frame structure. That is, for a given frame structure, a different number and arrangement of uplink and downlink subframes can be provided. For example, the following uplink/downlink configurations shown below in Table 1 can be provided:

TABLE 1

Exemplary Subframe Uplink/Downlink Configurations.

| Uplink-Downlink Configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | S | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | where "D" represents a downlink subframe, "U" represents an uplink subframe, "S" represents a special subframe and one frame includes ten subframes. The first downlink subframe in a discontinuous transmission can be considered to be a "uDL". For example, in Table 1, for uplink-downlink configuration "0," subframe no. 5 can be referred to as a uDL.

The wireless communication system 200 can implement one or more power saving modes of operation. During a power saving mode, the mobile device 220 can reduce power consumption by processing received signals less frequently. Longer durations between required receiving and processing operations can lead to increased battery life.

As an example, the wireless communication system 200 can support Connected Mode Discontinuous Reception (C-DRX) mode. The C-DRX mode can be as described in 3GPP TS 36.321, "3GPP EUTRA: Medium Access Control (MAC) Protocol Specification", v9.6.0, March 2012. With C-DRX, the mobile device 220 can conserve battery power during periods of inactivity. While operating in C-DRX, the mobile device 220 can shut down its receiver (e.g., enter a sleep mode) and can occasionally or periodically monitor a control channel (e.g., a Physical Downlink Control Channel (PDCCH) in LTE systems) at specified intervals. C-DRX may include two cycles—short and long—which can vary the length of time the mobile device 220 can shut down its receiver. In C-DRX mode, the absence of a downlink transmission for a plurality of short cycles may trigger a long cycle.

For many conventional wireless systems, when a mobile device monitors a communication channel and receives a first downlink transmission (i.e., a first discontinuous downlink transmission or uDL), the first downlink transmission is ignored for purposes of CSF estimation. In doing so, the mobile device may be required to stay activated for a much longer period of time to receive a subsequent discontinuous downlink transmission to be used for CSF estimation. This can drain battery life and can cancel power conservation gains intended to be realized when operating in a power saving mode, such as C-DRX. Accordingly, an aspect of the present invention is directed to improving CSF estimation during such operation.

Figure 3:
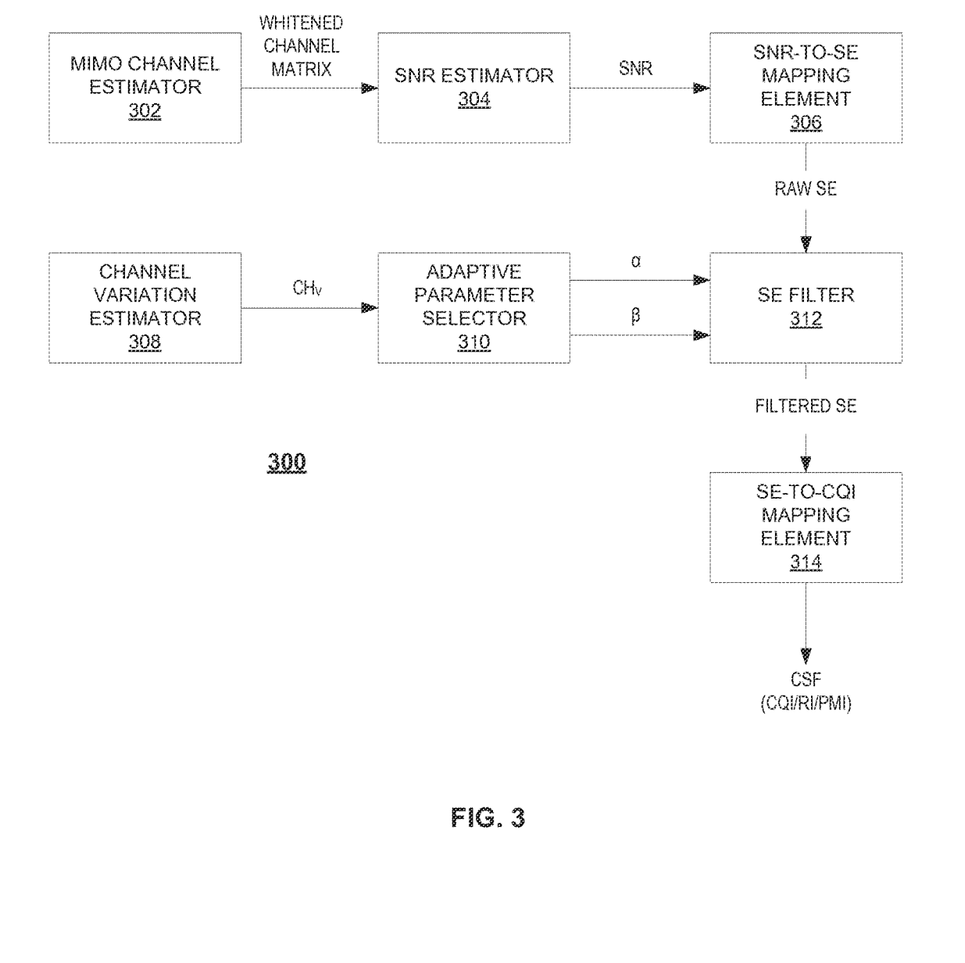
FIG. 3 illustrates an adaptive channel state feedback (CSF) estimation system that can be implemented by the mobile device depicted in FIG. 2 in accordance with an aspect of the present invention.

FIG. 3 illustrates an adaptive CSF estimation system 300 that can be implemented by the mobile device 220 of FIG. 2 according to an aspect of the present invention. The adaptive CSF estimation system 300 can generate a CSF report. The adaptive CSF estimation system 300 can generate a CSF report based on one or more received pilot symbols received over one or more downlink transmissions. The A CSF report may include three components: (1) a channel quality indicator (CQI); (2) a precoding matrix index (PMI); and (3) a rank indication (RI). The adaptive CSF estimation system 300 can include a multiple-input multiple-output (MIMO) channel estimator 302, a signal-to-noise ratio (SNR) estimator 304, an SNR-to-spectral efficiency (SE) mapping element 306, a channel variation estimator 308, an adaptive parameter selector 310, an SE filter 312, and an SE-to-CQI mapping element 314.

The MIMO channel estimator 302 can monitor a MIMO channel used to receive a downlink signal and can generate a whitened channeled matrix.

The SNR estimator 304 can analyze the whitened channeled matrix to generate an SNR estimate of the wireless channel. The SNR estimator 304 can execute a receiver algorithm to demodulate the downlink signal to generate the SNR estimate. The receiver algorithm can be, for example, a linear minimum mean square error (LMMSE), a maximum likelihood method (MLM), or a LMMSE with serial interference cancellation (LMMSE-SIC) algorithm. Further, the SNR estimation can be based on PMI (precoding matrix index) and RI (rank index).

The SNR-to-SE mapping element 306 can map the SNR estimate to an estimated SE metric considering the channel capacity and possible loss due to practical receiver implementations, thereby generating a raw SE metric. As an example, the SE estimation may be performed in a finer granularity with a smaller number of resource blocks (RBs) (e.g., 2 RBs).

The channel variation estimator 308 can monitor channel conditions. The channel estimator 308 can monitor channel conditions between discontinuous downlink subframes. The channel estimator 308 can generate a channel variation estimate, $CH_V$.

As an example, the channel variation estimator 308 can be implemented as a Doppler estimator that can generate a Doppler estimate, $\Phi_{est}$. In a dynamic propagation environment, for example, Doppler estimation can be used to estimate the Doppler spread experienced by the mobile device 220 as it moves with non-zero speed. Doppler spread may be directly proportional to the channel time correlation. In other words, the faster the mobile device 220 moves, the larger the Doppler spread and the smaller the channel correlation time.

Doppler spread can be estimated in a variety of ways. One way to estimate Doppler spread is by calculating channel time auto-correlation estimates to perform Doppler spread classification into various Doppler spread regimes. This technique exploits the direct relationship between the channel time auto-correlation and Doppler spread.

Another way to estimate Doppler spread is by maximum likelihood estimation based on Doppler power spectral density. For example, the mobile device 220 can estimate Doppler power spectral density (PSD) using channel estimation from one or more pilot signals. Doppler shift can then be estimated based on maximum likelihood estimation of the expected Doppler PSD because Doppler PSD of a fading channel is indicative of its effect on spectral broadening. A technique for determining Doppler PSD in Rayleigh fading channels is described in "A Statistical Theory of Mobile Radio Reception," by R. H. Clarke, Bell Systems Technical Journal 47 (6): 957-1000, 1968.

Alternatively or in addition to the these techniques, the channel variation estimator 308 can estimate other channel variation factors such as downlink block error rate (DL BLER)/cyclic redundancy check (CRC), frequency error, timing error, and/or any other suitable channel variation factors.

The adaptive parameter selector 310 can receive the channel variation estimate $CH_V$ from the channel estimator 308. The adaptive parameter selector 310 can compare the channel variation estimate $CH_V$ to a threshold value, $CH_{TH\_V}$. Based on the comparison result, the adaptive parameter selector 310 can select adaptive parameters to be applied to the CSF generation to account for the channel variation. For example, the adaptive parameter selector 310 can select values for α that correspond to filtering coefficients for adaptive SE filtering and may select values for β that corresponds to pilot symbol positions for adaptive sampling.

The SE filter 312 can include one or more FIR (finite impulse response) filters or one or more IIR (infinite impulse response) filters or a combination thereof to filter the raw SE metric to generate a filtered SE estimate or metric. FIR filtering can have a fixed length of memory and can be a weighted sum of previous SE estimation. IIR filtering, on the other hand, can have a memory of infinite length with the impact of each sample exponentially decreasing, which generally provides a smooth weighted average across the time. As an example, a single-pole IIR filter may be implemented, and the time constant can be approximated as the inverse of the IIR filter coefficient. Filter coefficients used by the SE filter 312 can be based on α values received from the adaptive parameter selector 310. The received β values can be used for adaptively sampling the received pilot symbol positions. The SE filter 312 may be implemented with optimal PMI/RI selection.

The SE-to-CQI mapping 314 may map the filtered SE estimation to a CQI value, which will can be reported back to the base station, for example, in an uplink transmission. A range of CQI values may be pre-set. For example, the following table lists CQI value ranges that may be used (which can be based on 3GPP TS 36.213, "3GPP Technical Specification Group Radio Access Network, Evolved Universal Terrestrial Radio Access (E-UTRA); Physical layer procedures", V9.3.0, Sep. 2010):

TABLE 2

Exemplary CQI Values

| CQI Index | Modulation | Code Rate × 1024 | Efficiency |
|---|---|---|---|
| 0 | | <out of range> | |
| 1 | QPSK | 78 | 0.1523 |

TABLE 2-continued

Exemplary CQI Values

| CQI Index | Modulation | Code Rate × 1024 | Efficiency |
|---|---|---|---|
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16-QAM | 378 | 1.4766 |
| 8 | 16-QAM | 490 | 1.9141 |
| 9 | 16-QAM | 616 | 2.4063 |
| 10 | 64-QAM | 466 | 2.7305 |
| 11 | 64-QAM | 567 | 3.3223 |
| 12 | 64-QAM | 666 | 3.9023 |
| 13 | 64-QAM | 772 | 4.5234 |
| 14 | 64-QAM | 873 | 5.1152 |
| 15 | 64-QAM | 948 | 5.5547 |

TABLE 3

Exemplary Modulation and TBS Index Table for Physical Downlink Shared Channel (PDSCH)

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Adaptive CSF estimation techniques described herein in accordance with an aspect of the present invention can be used in all communication modes of mobile device 202. For example, adaptive CSF estimation techniques can be used when the mobile device 220 operates in a connected continuous mode where adaptive CSF estimation may improve time budgets. Adaptive CSF estimation can be especially beneficial in C-DRX mode, however, because of power consumption considerations and because of the ability to provide accurate estimations with a small amount of data and little time.

Figure 4:
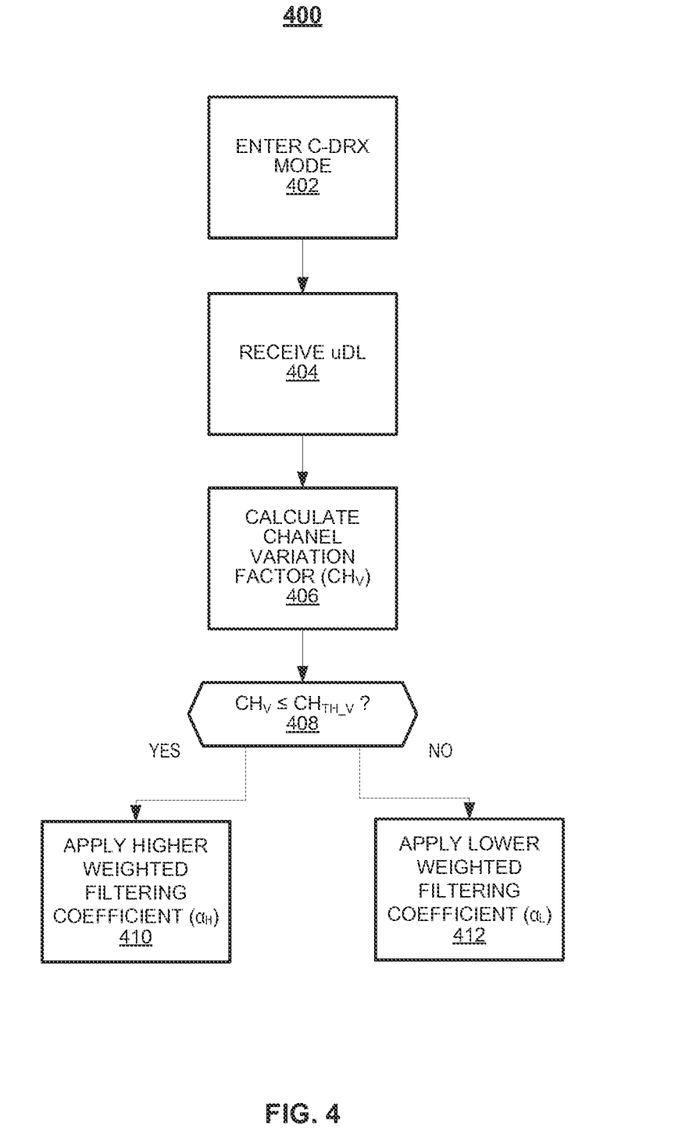
FIG. 4 provides an exemplary flowchart illustrating a method for providing adaptive CSF estimation in accordance with an aspect of the present invention.

FIG. 4 provides an exemplary flowchart illustrating a method 400 for providing adaptive CSF estimation in accordance with an aspect of the present invention. The method 400 can be implemented by the mobile device 220, including mobile device 220 having adaptive CSF estimation system 300 described above in relation to FIGS. 2 and 3, respectively. The method 400 is exemplary and an aspect of the present invention provides for the steps of the method 400 to be performed in different sequences or with multiple steps being performed at substantially the same time.

At step 402, a power saving mode of operation can be entered. As an example, C-DRX mode of operation can be entered. As described above, C-DRX mode is a connected discontinuous reception mode that allows mobile device to conserve battery power during periods of inactivity.

At step 404, a downlink transmission is received. The downlink transmission can be a discontinuous downlink transmission including one or more subframes. The downlink transmission can be a uDL.

At step 406, a channel variation factor, $CH_V$, can be calculated. As an example, the channel variation factor $CH_V$ can be a Doppler estimate $\Phi_{est}$. Calculating the channel variation factor can be considered to be monitoring the transmission channel conditions or determining a condition of the transmission channel.

At step 408, the channel variation factor $CH_V$ can be compared to a threshold value, $CH_{TH\_V}$. As an example, for a Doppler estimate $\Phi_{est}$, it can be compared to a Doppler threshold value, $\Phi_{thres}$.

At step 410, if the channel variation factor $CH_V$ is less than or equal to the threshold value $CH_{TH\_V}$, then a higher weighted filtering coefficient, $\alpha_H$, can be applied. As an example, for a Doppler estimate $\Phi_{est}$, if it is less than or equal to $\Phi_{thres}$, then a higher weighted filtering coefficient $\alpha_H$ can be applied. If the channel variation factor $CH_V$ is greater than the threshold value $CH_{TH\_V}$, then a lower weighted filtering coefficient, $\alpha_L$, can be applied. As an example, for a Doppler estimate $\Phi_{est}$, if it greater than $\Phi_{thres}$, then the lower weighted filtering coefficient $\alpha_L$ can be applied. Further, $\alpha_H$ can be larger (e.g., its magnitude) than $\alpha_L$ ($\alpha_H > \alpha_L$).

The selected filter coefficient, either $\alpha_H$ or $\alpha_L$, can be used to perform SE filtering. For example, as shown in FIG. 3, the filter coefficient selected by the adaptive parameter selector 310 can be provided to the SE filter 312 to filter a raw SE metric provided by the SNR-to-SE mapping elements 306. The resulting filtered SE metric can then be used by the SE-to-CQI mapping element 314 to generate a portion of the CSF estimation. In this way, the CSF estimation is based on channel conditions and weighted accordingly. For example, the CSF estimation can be provided for a uDL and weighted based on channel conditions and specifically how quickly the channel conditions are varying.

Based on the adaptive CSF estimate method 400, if the channel conditions tend to vary (i.e., exceed a threshold), a lower weight may be applied to the CSF estimation. Conversely, if the channel conditions tend to be stable (i.e., below a threshold), a higher weight may be applied to the CSF estimation. The adaptive CSF estimation illustrated in FIG. 4 can extend to multiple pilot symbols received over multiple downlink transmissions.

Figure 5:
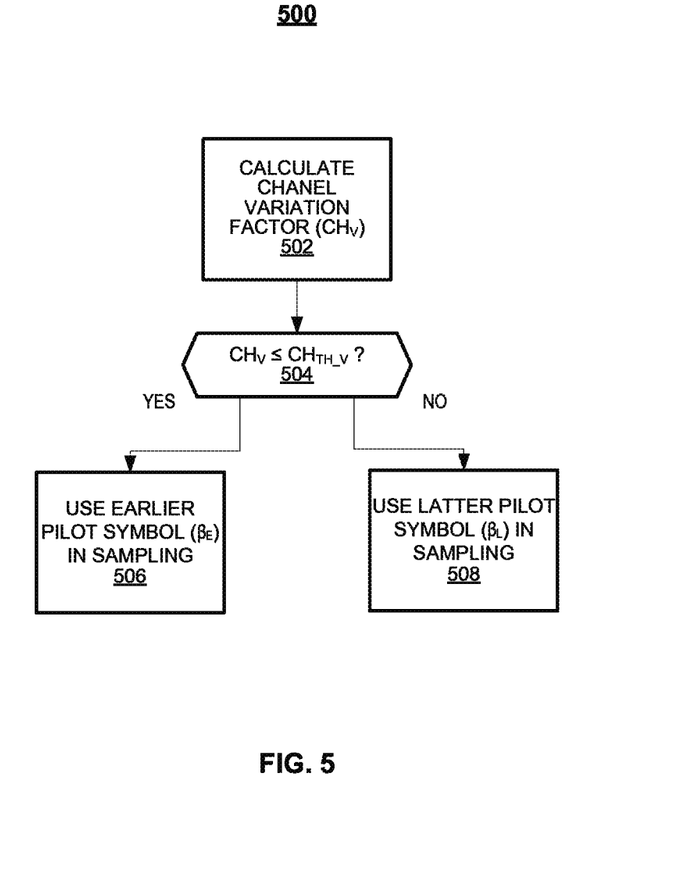
FIG. 5 provides an exemplary flowchart illustrating a method for providing adaptive CSF sampling in accordance with an aspect of the present invention.

FIG. 5 provides an exemplary flowchart illustrating a method 500 for providing adaptive CSF sampling in accordance with an aspect of the present invention. The method 500 can be implemented by the mobile device 220, including mobile device 220 having adaptive CSF estimation system 300 described above in relation to FIGS. 2 and 3, respectively. The method 500 is exemplary and an aspect of the present invention provides for the steps of the method 500 to be performed in different sequences or with multiple steps being performed at substantially the same time.

At step 502, a channel variation factor, $CH_V$, can be calculated. As an example, the channel variation factor $CH_V$ can be a Doppler estimate $\Phi_{est}$. Calculating the channel variation factor can be considered to be monitoring the transmission channel conditions or determining a condition of the transmission channel.

At step 504, the channel variation factor $CH_V$ can be compared to a threshold value, $CH_{TH\_V}$. As an example, for a Doppler estimate $\Phi_{est}$, it can be compared to a Doppler threshold value, $\Phi_{thres}$.

At step 506, if the channel variation factor $CH_V$ is less than or equal to the threshold value $CH_{TH\_V}$, then an earlier pilot symbol $\beta_E$ can be used for sampling.

At step 508, if the channel variation factor $CH_V$ is greater than the threshold value $CH_{TH\_V}$, then a later pilot symbol $\beta_L$ can be used for sampling.

The earlier pilot symbol $\beta_E$ is received prior to the later pilot symbol $\beta_L$. As an example, for a Doppler estimate $\Phi_{est}$, if it is less than or equal to $\Phi_{thres}$, then $\beta_E$ can be used. Otherwise, $\beta_L$ can be used. Based on the adaptive CSF sampling method 500, if the channel conditions tend to vary (i.e., exceed threshold), a later pilot symbol may be used for sampling that will better approximate channel conditions at the current CSF estimation time. However, if the channel conditions tend to be stable (i.e., below threshold), an earlier pilot symbol may be used for sampling.

The adaptive CSF sampling method 500 can be applied to a given received subframe. For example, a received subframe can include four pilot symbols (e.g., at symbol positions 0, 4, 7, 11). If the channel conditions over which received downlink frames tend to vary (i.e., exceed threshold), a later pilot symbol can be used for sampling. For example, the pilot symbol at symbol position 11 (rather than an earlier pilot symbol at symbol positions 0, 4, or 7) can be used. By using a later pilot symbol, the CSF estimation may resemble current channel conditions more accurately than using an earlier pilot symbol.

However, if the channel conditions tend to be stable (i.e., below threshold), an earlier pilot symbol can be used for sampling. For example, the pilot symbol at symbol position 0 (rather than a later received pilot symbol at symbol positions 4, 7, or 11) can be used. By using an earlier pilot symbol, the mobile device (e.g., mobile device 220) can have more time to perform the CSF estimation without compromising accuracy while using power more efficiently since the channel conditions at the time of sampling may resemble current conditions. The adaptive CSF sampling illustrated in FIG. 5 can extend to multiple pilot symbols received over multiple downlink transmissions.

The selected pilot symbol, either $\beta_L$ or $\beta_E$, can be used to perform SE filtering. For example, as shown in FIG. 3, the selected pilot symbol can be used by the adaptive parameter selector 310 and the SE filter 312 to determine filter coefficient $\alpha$. The filter coefficient used by the SE filter 312 can be based on the selected pilot symbol used for sampling. The filter coefficient can be used to filter a raw SE metric provided by the SNR-to-SE mapping element 306. The resulting filtered SE metric can then be used by the SE-to-CQI mapping element 314 to generate a portion of the CSF estimation. In this way, the CSF estimation is based on channel conditions and weighted accordingly. For example, the CSF estimation can be provided for a uDL and weighted based on channel conditions and specifically how quickly the channel conditions are varying.

While various aspects of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

We claim:

1. A method, comprising:
   receiving a first sequence of pilot symbols from a base station over a wireless transmission channel, including at least a first pilot symbol and a second pilot symbol, wherein the second pilot symbol is received after the first pilot symbol;
   determining first channel variation information for the transmission channel;
   selecting to sample the first pilot symbol and not the second pilot symbol based on the first channel variation not meeting a threshold;
   determining a first channel state feedback (CSF) estimation using the selected first pilot symbol;
   transmitting the first CSF estimation to the base station;
   receiving a second sequence of pilot symbols from the base station over the wireless transmission channel, including at least a third pilot symbol and a fourth pilot symbol, wherein the fourth pilot symbol is received after the third pilot symbol;
   determining second channel variation information for the transmission channel;
   selecting to sample the fourth pilot symbol and not the third pilot symbol based on the second channel variation meeting the threshold;
   determining a second CSF estimation using the selected fourth pilot symbol; and
   transmitting the second CSF estimation to the base station.

2. The method of claim 1, further comprising:
   receiving a downlink subframe containing the first pilot symbol and the second pilot symbol.

3. The method of claim 1, further comprising:
   receiving a discontinuous downlink subframe containing the first pilot symbol and the second pilot symbol.

4. The method of claim 3, further comprising:
   receiving the discontinuous downlink subframe after entering a power saving mode of operation.

5. The method of claim 3, further comprising:
   receiving the discontinuous downlink subframe after entering a Connected Mode Discontinuous Reception (C-DRX) mode of operation.

6. The method of claim 1, wherein determining the first channel variation information includes calculating a Doppler estimate.

7. An apparatus, comprising:
   channel condition circuitry configured to monitor variation of a wireless channel, wherein the apparatus is configured to receive a sequence of pilot symbols from a base station over the wireless channel, including at least a first pilot symbol and a second pilot symbol, wherein the second pilot symbol is received after the first pilot symbol;
   one or more processing elements configured to:
      select to sample the second pilot symbol and not the first pilot symbol based on the monitored variation meeting a threshold; and
      select to sample the first pilot symbol and not the second pilot symbol based on the monitored variation not meeting the threshold; and
      determine a channel state feedback (CSF) estimation using the selected one of the first pilot symbol and the second pilot symbol.

8. The apparatus of claim 7, further comprising one or more circuit elements configured to transmit the CSF estimation to the base station.

9. The apparatus of claim 7, wherein to monitor variation of the wireless channel, the channel condition circuitry is configured to calculate a Doppler estimate.

10. The apparatus of claim 7, wherein the first pilot symbol and the second pilot symbol are included in the same downlink subframe.

11. The apparatus of claim 7, wherein the apparatus is configured to receive the first pilot symbol and the second pilot symbol in a discontinuous downlink subframe that is received after the apparatus has entered a power saving mode of operation.

12. The apparatus of claim 7, wherein the apparatus is further configured to:
   determine one or more spectral efficiency filter coefficients based on the sampled pilot symbol;
   filter a spectral efficiency metric based on the determined one or more spectral efficiency filter coefficients to generate a filtered spectral efficiency metric; and
   map the filtered spectral efficiency metric to a channel quality indicator (CQI) index to form a portion of the CSF estimation.

13. A non-transitory computer-readable medium having instructions stored thereon that are executable by a computing device to perform operations comprising:
   receiving a first sequence of pilot symbols from a base station over a wireless transmission channel, including at least a first pilot symbol and a second pilot symbol, wherein the second pilot symbol is received after the first pilot symbol;
   determining first channel variation information for the transmission channel;
   selecting to sample the first pilot symbol and not the second pilot symbol based on the first channel variation not meeting a threshold; determining a first channel state feedback (CSF) estimation using the selected first pilot symbol;
   transmitting the first CSF estimation to the base station;
   receiving a second sequence of pilot symbols from the base station over the wireless transmission channel, including at least a third pilot symbol and a fourth pilot symbol, wherein the fourth pilot symbol is received after the third pilot symbol;
   determining second channel variation information for the transmission channel;
   selecting to sample the fourth pilot symbol and not the third pilot symbol based on the second channel variation meeting the threshold;
   determining a second CSF estimation using the selected fourth pilot symbol; and
   transmitting the second CSF estimation to the base station.

14. The non-transitory computer-readable medium of claim 13, wherein calculating the first channel variation information includes calculating a Doppler estimate.

15. The non-transitory computer-readable medium of claim 13, wherein the first pilot symbol and the second pilot symbol are included in the same downlink subframe.

16. The non-transitory computer-readable medium of claim 13, wherein first pilot symbol and the second pilot symbol are included in a discontinuous downlink subframe that is received after the computing device has entered a power saving mode of operation.

* * * * *